(12) United States Patent
Matama

(10) Patent No.: US 6,384,937 B1
(45) Date of Patent: May 7, 2002

(54) IMAGE PROCESSING METHOD AND APPARATUS

(75) Inventor: Toru Matama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/276,831

(22) Filed: Mar. 26, 1999

(30) Foreign Application Priority Data

Mar. 26, 1998 (JP) ............................................. 10-078867

(51) Int. Cl.[7] .......................... H04N 1/58; H04N 1/409; G06K 15/02; G06T 5/00
(52) U.S. Cl. ..................... 358/1.9; 358/529; 358/532; 358/463; 382/263; 382/264; 382/275
(58) Field of Search ....................... 358/1.9, 532, 530, 358/527, 518, 520, 521, 447, 463; 382/260, 261, 263, 264, 275, 274

(56) References Cited

U.S. PATENT DOCUMENTS

| | | | | |
|---|---|---|---|---|
| 4,812,903 A | * | 3/1989 | Wagensonner et al. | 358/520 |
| 5,012,333 A | * | 4/1991 | Lee et al. | 358/520 |
| 5,606,630 A | * | 2/1997 | Maeda et al. | 358/518 |
| 5,739,922 A | | 4/1998 | Matama | 358/447 |
| 5,905,817 A | | 5/1999 | Matama | 382/260 |

\* cited by examiner

*Primary Examiner*—Scott Rogers
(74) *Attorney, Agent, or Firm*—Birch, Stewart, Kolasch & Birch, LLP

(57) ABSTRACT

When it is determined that a film original is at least one of an under-exposed negative film and a high sensitive film, the image processing method and apparatus separate the input image signals into at least three kinds of frequency components composed of lowest frequency components a band of which is made more narrower, frequency components containing high frequency components and at least one kind of remaining frequency components, enhance frequency components containing the high frequency components, suppress at least one kind of frequency components of the remaining frequency components and synthesize both of enhanced and suppressed frequency components and the lowest frequency components. The method and apparatus are capable of obtaining a reproduced image having good image quality by suppressing graininess and further improving the reproduced image particularly in the under-exposed negative film and the high sensitive negative.

20 Claims, 6 Drawing Sheets

IMAGE PROCESSING METHOD AND APPARATUS

BACKGROUND OF THE INVENTION

1. Field of the Invention

The present invention broadly pertains to an image processing method and apparatus. More particularly, the present invention relates to an image processing method and apparatus, wherein image processing is carried out on color image signals, which have been obtained by reading a color image.

2. Description of the Prior Art

With techniques for reading a color image and reproducing the color image as a visible image, a color image having been recorded on photographic film, or the like, is photo-electrically read with a sensor, such as a charge coupled device (CCD), and red (R), green (G), and blue (B) three primary color image signals are thereby obtained. Various image processing operations are carried out on the image signals, and a visible image is reproduced on a recording material from the image signals, which have been obtained from the image processing. Systems for carrying out such techniques have been proposed, wherein a pre-scanning operation and a fine scanning operation are carried out. In the pre-scanning operation, a color image is scanned at coarse scanning intervals and is read photoelectrically. In this manner, the image information concerning the color image is approximately ascertained. Various parameters to be used in carrying out the image processing are set in accordance with the information, which has been obtained from the pre-scanning operation. Thereafter, the fine scanning operation is carried out. In the fine scanning operation, the color image is scanned at fine scanning intervals, and the R, G, and B three color image signals to be used for reproducing the visible image are obtained.

As the techniques for carrying out the image processing in the systems described above, for example, various techniques for enhancing the image sharpness by carrying out the image processing on the image signal, which represents a given image, have been proposed. As one of such techniques, a technique for enhancing the image sharpness by carrying out unsharp mask processing on the image signal has been proposed in, for example, "Image Analysis Handbook," the publishing circle of the University of Tokyo, supervised by Mikio Takagi and Yokyu Shimoda, p. 549.

Also, a processing technique for suppressing the graininess of a reproduced image and enhancing the image sharpness has been proposed in, for example, U.S. Pat. No. 4,812,903. With the proposed processing technique, R, G, and B three color image signals are separated into a luminance signal and chrominance signals. Nonlinear processing is carried out on low frequency components of the luminance signal. Also, processing for enhancing high frequency components of the luminance signal is carried out. Thereafter, the luminance signal, which has been obtained from the processing, and the chrominance signals are combined together.

Further, a different image processing technique for enhancing the image sharpness and suppressing the image graininess has been proposed in, for example, Japanese Unexamined Patent Publication (Kokai) No. 63-26783. With the proposed image processing technique, a luminance signal and chrominance signals (representing the hue, the saturation, or the like) are extracted from image signals, which represent a color image. Spatial filter processing is carried out to the luminance signal to thereby obtain spatial general information and spatial detail information. Predetermined enhancement processing is then carried on the spatial general information and the spatial detail information. Thereafter, the spatial general information and the spatial detail information, which have been obtained from the enhancement processing, are combined together, and a new luminance signal is thereby obtained. The new luminance signal and the chrominance signals are then combined together and converted into predetermined color image signals. With the proposed image processing technique, a processed image can be obtained, which has been subjected to natural sharpness enhancement processing such that little change in the color tone, or the like, may occur, and in which the graininess has been suppressed.

Furthermore, as for ordinary analog photographs, it has been known that, in cases where a photograph is enlarged from 35 mm film, or the like, to a size of 203 mm×254 mm, 254 mm×305 mm, or larger, patterns of grains in the film become perceptible, depending upon colors, and the image quality deteriorates. Therefore, an image processing technique for suppressing the graininess of the output image has been proposed in, for example, Japanese Unexamined Patent Publication (Kokai) No. 1-277061. With the proposed image processing technique a predetermined color portion, such as a flesh-color portion, is extracted from a color image. In cases where the area of the predetermined color portion having thus been extracted becomes equal to a predetermined area or larger, noise removal processing is carried out on the predetermined color portion. In this manner, boundary lines between grains in the flesh-color or skin color region are removed, and the graininess of the output image is thereby suppressed.

Also, a technique for enhancing the image sharpness has been proposed in, for example, Japanese Patent Application Publication (Kokai) No. 3-502975. With the proposed technique, the image sharpness is enhanced by changing the value of a coefficient K in the formula for unsharp mask processing, which is shown below, in accordance with a characteristic portion of the image.

$$S' = S_{org} + K \cdot (S_{org} - S_{us})$$

wherein $S_{org}$ represents the original image signal, and $S_{us}$ represents the unsharp mask signal. Specifically, with the proposed technique, local variance values, which are plotted with respect to the frequency of occurrence, are calculated as for a flat portion of the image, in which the level of noise due to the film graininess is high, a texture portion of the image, and an edge portion of the image. The value of the coefficient K is set as functions of the local area limited variance values.

However, with the techniques described above, a reproduced image having good image quality cannot be obtained. For example, with the unsharp mask processing described above, the sharpness can be enhanced. However, the unevenness due to the film graininess is also enhanced together with the enhancement of the sharpness. As a result, a reproduced image having good image quality and little noise cannot be obtained. With the technique proposed in U.S. Pat. No. 4,812,903 or Japanese Unexamined Patent Publication (Kokai) No. 63-26783, wherein the high frequency components of colors are not enhanced, the uneven feeling due to the film graininess can be suppressed to be lower than with the unsharp mask processing. However, unevenness of the luminance components due to the film graininess still remains unremoved. With the technique proposed in Japanese Unexamined Patent Publication No.

(Kokai) 1-277061, noise due to the film graininess can be removed. However, the image sharpness cannot be enhanced and, as a result, a reproduced image which is easy to view cannot be obtained.

With the technique proposed in Japanese Patent Application Publication (Kokai) No. 3-502975, noise due to the film graininess can be suppressed, and the sharpness can be enhanced. However, the local variance values of the texture portion, the edge portion, or the like, in which the amplitude of the image signal is small, cannot be easily separated from the local variance values of the flat portion. Therefore, it often occurs that the texture and the edge, which are to be reproduced with a high sharpness, are suppressed in the same manner as that for noise in the flat portion.

In contrast, the applicant has proposed an image processing apparatus and method for suppressing graininess due to a film and enhancing sharpness in Japanese Unexamined Patent Publication (Kokai) No. 9-22460. In an image signal representing an ordinary image, the components, which have effects upon the sharpness of the reproduced image, are the high frequency components of the image signal. The film graininess, which appears as the unevenness in the reproduced image, is contained primarily in the middle frequency components. The present invention has been achieved on such findings. According to the invention, the image signal is separated into the low frequency components, the middle frequency components, and the high frequency components. The high frequency components are enhanced as well as the middle frequency components are suppressed to thereby enhance sharpness and suppress unevenness.

The above method is effective to suppress graininess due to an ordinary film and enhance sharpness. However, the method has a plenty of problems to be improved as to its effect on graininess which remains in the low frequency components, particularly in an under-exposed negative film, which is insufficiently exposed, and a high sensitive negative.

SUMMARY OF THE INVENTION

An object of the present invention which was made in view of the conventional problems is to provide an image processing method and apparatus capable of obtaining a reproduced image having good image quality by suppressing graininess and further improving the reproduced image particularly in the under-exposed negative film and the high sensitive negative.

To solve the above problems, the present invention provides an image processing method for carrying out graininess suppression to input image signals which have been obtained by photoelectrically reading a film original by an image reading device, comprising the steps of:

separating the input image signals into at least three kinds of frequency components composed of lowest frequency components a band of which is made more narrower, when it is determined that the film original is at least one of an under-exposed negative film and a high sensitive film, as compared with a case that the film original is neither the under-exposed negative film nor the high sensitive film, frequency components containing high frequency components and at least one kind of remaining frequency components;

enhancing the frequency components containing the high frequency components; as well as suppressing at least one kind of frequency components of the at least one kind of the remaining frequency components; and synthesizing the enhanced frequency components, the suppressed frequency components and the lowest frequency components.

It is preferable that the lowest frequency components are regarded as first low frequency components;

at least one kind of the remaining frequency components is separated into second low frequency components and middle frequency components in order of frequency; and said input image signals are separated into the first low frequency components, the second low frequency components, the middle frequency components and the high frequency components in order of frequency.

The present invention also provides a method for performing image processing to carry out graininess suppression on input image signals which have been obtained by photoelectrically reading a film original by an image reading device, comprising the steps of:

when it is determined that said film original is at least one of an under-exposed negative film and a high sensitive film, classifying the input image signals into four kinds of frequency components composed of first low frequency components having a lowest frequency band, second low frequency components, middle frequency components and high frequency components, as well as separating the input image signals into at least three kinds of frequency components composed of the first low frequency components, frequency components containing at least the second low frequency components and frequency components containing at least the high frequency components;

performing enhancement processing on the frequency components containing at least the high frequency components;

performing suppression processing on the frequency components containing at least the second low frequency components; and synthesizing both kinds of the processed frequency components and the first low frequency components.

It is preferable to create the first low frequency components using an IIR filter.

It is preferable to change the lowest band of the first low frequency components in accordance with a print size of a print which is printed out after the image processing is carried out.

It is preferable that the frequency components are distributed in a pattern such that they may have a peek at a Nyquist frequency of output in reproduction of a visible image from image signals having been processed, the middle frequency components are distributed in a pattern such that they may have a peek in a vicinity of ⅓ to the Nyquist frequency of the output, the first low frequency components are lower halves of low frequency components that are distributed in a pattern such that they may have a peek at a frequency of zero, and the second low frequency components are upper halves of said low frequency components.

It is preferable that the high frequency components contain information concerning edge and fine texture portions of a color image of the film original, the middle frequency components contain unevenness due to graininess of the film original, the first low frequency components contain neither the information concerning the edge and fine texture portions of the color image of the film original nor the unevenness due to the graininess of the film original, and the second frequency components contain no information concerning the edge and fine texture portions of the color image of the film original and the unevenness due to the graininess of the film original in case that the film original is at lest one of the under-exposed negative film and the high sensitive film.

It is preferable that luminance components are extracted from the high and middle frequency components and the enhancement processing and suppression processing are performed based on the luminance components.

It is preferable that the image processing for carrying out the graininess suppression can be switched to one of soft focus processing and dodging processing by modes which are previously set.

It is preferable that, when it is determined that the film original is neither the under-exposed negative film nor the high sensitive film, the input image signals are separated into three kinds of the frequency components composed of a low frequency components containing the first and second frequency components, the middle frequency components, the high frequency components, the enhancement processing is performed on the high frequency components, the suppression processing is performed on the middle frequency components and both processed frequency components and the low frequency components are synthesized.

To solve the problem described above, the present invention provides an image processing apparatus for carrying out graininess suppression to input image signals which has been obtained by photoelectrically reading a film original by an image reading device, comprising:

determination means for determining that the film original is at least one of an under-exposed negative film and a high sensitive film;

separation means for separating the input image signals into at least three kinds of frequency components composed of lowest frequency components a band of which is made more narrower, when it is determined by the determination means that the film original is at least one of the under-exposed negative film and the high sensitive film, as compared with a case that the film original is neither the under-exposed negative film nor the high sensitive film, frequency components containing high frequency components and at least one kind of remaining frequency components;

enhancement means for enhancing the frequency components containing the high frequency component;

suppression means for suppressing at least one kind of frequency components of the at least one kind of the remaining frequency components; and synthesis means for synthesizing the enhanced frequency components, the suppressed frequency components and the lowest frequency components.

It is preferable that the separation means regards the lowest frequency components as first low frequency components, separates the at least one kind of the remaining frequency components into second low frequency components and middle frequency components in order of frequency and separates the input image signals into the first low frequency components, the second frequency components, the middle frequency components and the high frequency components in order of frequency.

The present invention also provides an apparatus for performing image processing to carry out graininess suppression on input image signals which have been obtained by photoelectrically reading a film original by an image reading device, comprising:

determination means for determining that the film original is at least one of an under-exposed negative film and a high sensitive film;

classification means for classifying the input image signals into four kinds of frequency components composed of first low frequency components having a lowest frequency band, second low frequency components, middle frequency components and high frequency components;

separation means for separating the input image signals into at least three kinds of frequency components composed of the first low frequency components, frequency components containing at least the second low frequency components and frequency components containing at least the high frequency components, when determined that the film original is at least one of the under-exposed negative film and the high sensitive film;

enhancement processing means for performing enhancement processing on the frequency components containing at least the high frequency components;

suppression processing means for performing suppression processing on the frequency components containing at least second low frequency components; and synthesis means for synthesizing both kinds of the processed frequency components and the first low frequency components.

It is preferable that the separation means creates the first low frequency components using an IIR filter.

It is preferable that the apparatus further comprises changing means for changing the lowest band of the first lower frequency components in accordance with a print size of a print which is printed out after the image processing is carried out.

It is preferable that the frequency components are distributed in a pattern such that they may have a peek at a Nyquist frequency of output in reproduction of a visible image from image signals having been processed, the middle frequency components are distributed in a pattern such that they may have a peek in a vicinity of ⅓ to the Nyquist frequency of the output, the first low frequency components are lower halves of low frequency components that are distributed in a pattern such that they may have a peek at a frequency of zero, and the second low frequency components are upper halves of said low frequency components.

It is preferable that the high frequency components contain information concerning edge and fine texture portions of a color image of the film original, the middle frequency components contain unevenness due to graininess of the film original, the first low frequency components contain neither the information concerning the edge and fine texture portions of the color image of the film original nor the unevenness due to the graininess of the film original, and the second frequency components contain no information concerning the edge and fine texture portions of the color image of the film original and the unevenness due to the graininess of the film original in case that the film original is at least one of the under-exposed negative film and the high sensitive film.

It is preferable that the apparatus further comprises extracting means for extracting luminance components from the high and middle frequency components, wherein the enhancement processing means and the suppression means perform the enhancement processing and suppression processing based on the luminance components extracted by the extracting means, respectively.

Further, it is preferable that the image processing apparatus comprises switching means for switching modes from the image processing for carrying out the graininess suppression to one of soft focus processing and dodging processing which are previously set as the modes.

It is preferable that, when it is determined by the determination means that the film original is neither the under-exposed negative film nor the high sensitive film, the separation means separates the input image signals into three kinds of the frequency components composed of a low frequency components containing the first and second frequency components, the middle frequency components, the high frequency components, the enhancement processing means performs the enhancement processing on the high frequency components, the suppression processing means performs the suppression processing on the middle frequency components and the synthesis means synthesizes both processed frequency components and the low frequency components.

DETAILED DESCRIPTION OF THE INVENTION

An image processing method and apparatus of the present invention will be described below in detail based on the preferred embodiment shown in the accompanying drawings.

Figure 1:
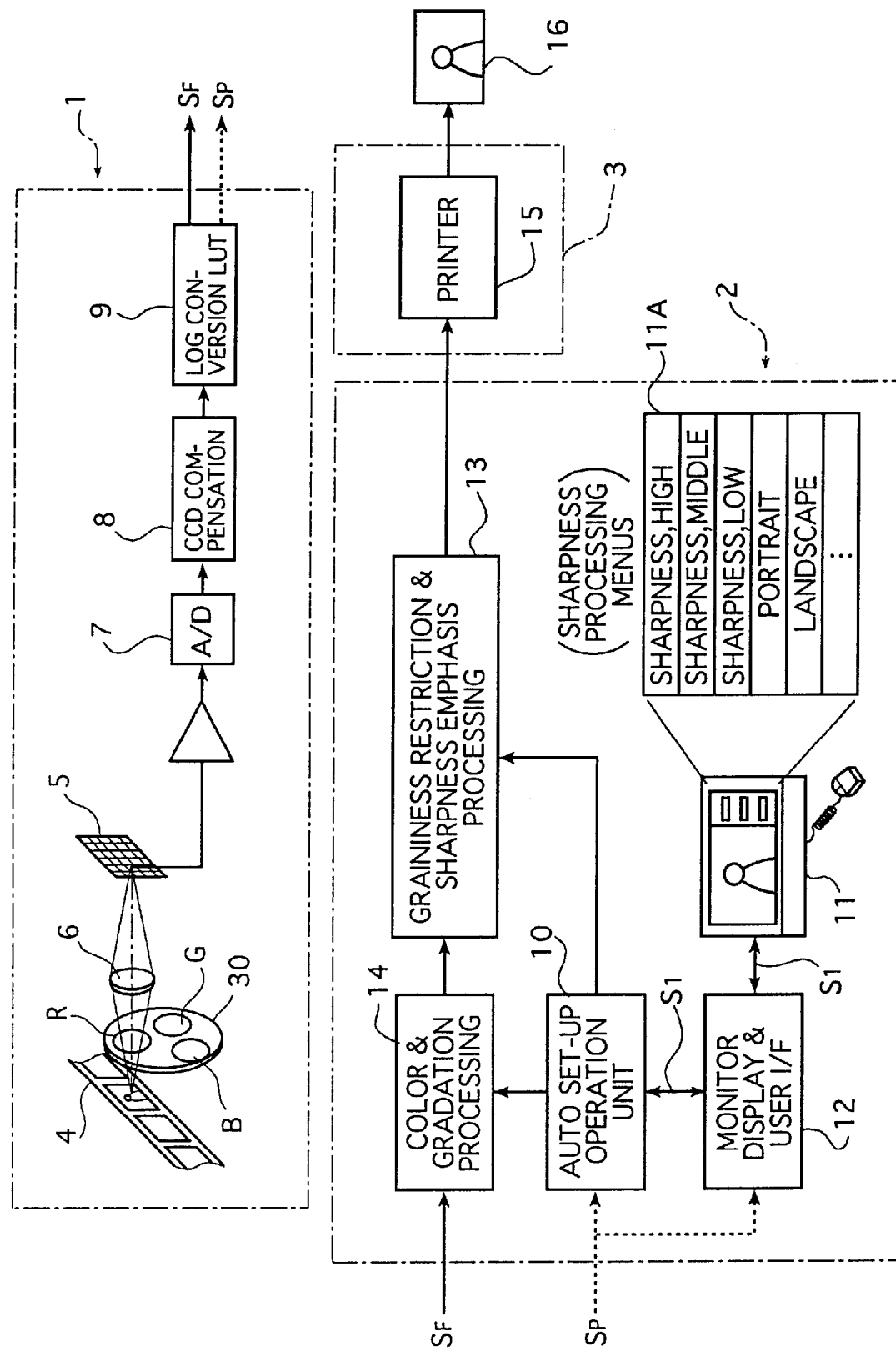
FIG. 1 is a block diagram schematically showing a system to which an embodiment of an image processing apparatus of the present invention is applied.

FIG. 1 is a block diagram showing a system including an image processing apparatus according to the present invention, wherein an image is read out from a color photograph, and a visible image is reproduced on a recording material. As shown in FIG. 1, the system including the image processing apparatus according to the present invention is composed of a reading section 1 for reading an image from a color photograph, an image processing section 2 for carrying out image processing on the image signal, which represents the image on the color photograph and is obtained from the reading section 1, and a reproducing section 3 for reproducing the visible image on the recording material from the image signal, which has been obtained from the image processing carried out by the image processing section 2.

The reading section 1 is provided with a CCD array 5, which photoelectrically detects R, G, and B color image signals from a color image 4 having been recorded on negative film, reversal film or the like. The reading section 1 is also provided with an image forming lens 6 for focusing an image of light which comes from the color image 4 onto the CCD array 5. In the embodiment, the CCD array 5 is constituted of 2,760×1,840 pixels. The color image 4 is scanned, while a filter turret 30, which is provided with a red (R), green (G), and blue (B) three color separation filter, is being rotated. In this manner, the image signals representing the full-color image are obtained in an area sequential mode. The reading section 1 is further provided with an analog-to-digital converter 7 for converting the analog image signals, which represent the color image and have been detected by the CCD array 5, into digital image signals, and a CCD compensation unit 8 for carrying out compensation for the CCD array 5. The reading section 1 is still further provided with a logarithmic conversion unit 9 having a look-up table for logarithmic conversion of the image signals, which represent the color image and have been corrected by the CCD compensation unit 8. With the read-out unit 1, a pre-scanning operation is carried out before a fine scanning operation for obtaining the R, G, and B three color image signals is carried out. In the pre-scanning operation, the color image 4 is scanned at coarse scanning intervals and is thus approximately read photoelectrically. Pre-scanning data $S_P$ are obtained from the pre-scanning operation. Thereafter, the fine scanning operation is carried out by scanning the color image 4 at fine scanning intervals, and fine scanning data $S_F$ are thereby obtained.

The image processing section 2 is provided with an automatic set-up operation unit 10 for setting parameters, which are to be used in gradation processing or the like during the fine scanning operation, based on the pre-scanning data $S_P$. The image processing section 2 is also provided with a color and gradation processing unit 14 for carrying out color and gradation processing on the fine scanning data $S_F$ based on the parameters, which have been set by the automatic set-up operation unit 10. The image processing unit 2 is further provided with a monitor display and user interface 12 for connecting the automatic set-up operation unit 10 and a CRT display device 11, which reproduces a visible image from the pre-scanning data $S_P$, with each other. The image processing section 2 is still further provided with a processing section 13, which is the feature of the present invention and which carries out graininess suppression processing and sharpness enhancement processing on the color image signals.

The reproducing section 3 is provided with a printer 15 for recording a color image signal on the recording material 16.

How the respective sections and units operate will be described below.

Firstly, with the reading section 1, the pre-scanning operation is carried out, in which the color image 4 having been recorded on negative film, reversal film, or the like, is scanned at coarse scanning intervals and is thus read out approximately. The three-color pre-scanning data $S_P$, which have been obtained from the pre-scanning operation, are converted by the analog-to-digital converter 7 into digital image signals. The digital pre-scanning data $S_P$ are corrected by the CCD compensation unit 8, logarithmically amplified by the logarithmic conversion unit 9, and fed into the automatic set-up operation unit 10 and the monitor display and user interface (hereinbelow referred to as the interface) 12 of the image processing section 2. The pre-scanning data $S_P$ are fed from the interface 12 into the CRT display device 11, and a visible image is reproduced on the CRT display device 11 from the pre-scanning data $S_P$. Besides the visible image, sharpness processing menus 11A are displayed on the CRT display device 11. A desired menu is selected by the user from the sharpness processing menus 11A, and a signal $S_1$ representing the results of the selection is fed from the CRT display device 11 into the interface 12 and then into the automatic set-up operation unit 10. In the automatic set-up operation unit 10, the parameters for the color and gradation processing, which is carried out by the color and gradation processing unit 14, are set based on the pre-scanning data $S_P$ and the signal $S_1$. Information representing some of the parameters is fed into the processing unit 13, which will be described later in detail.

Figure 2:
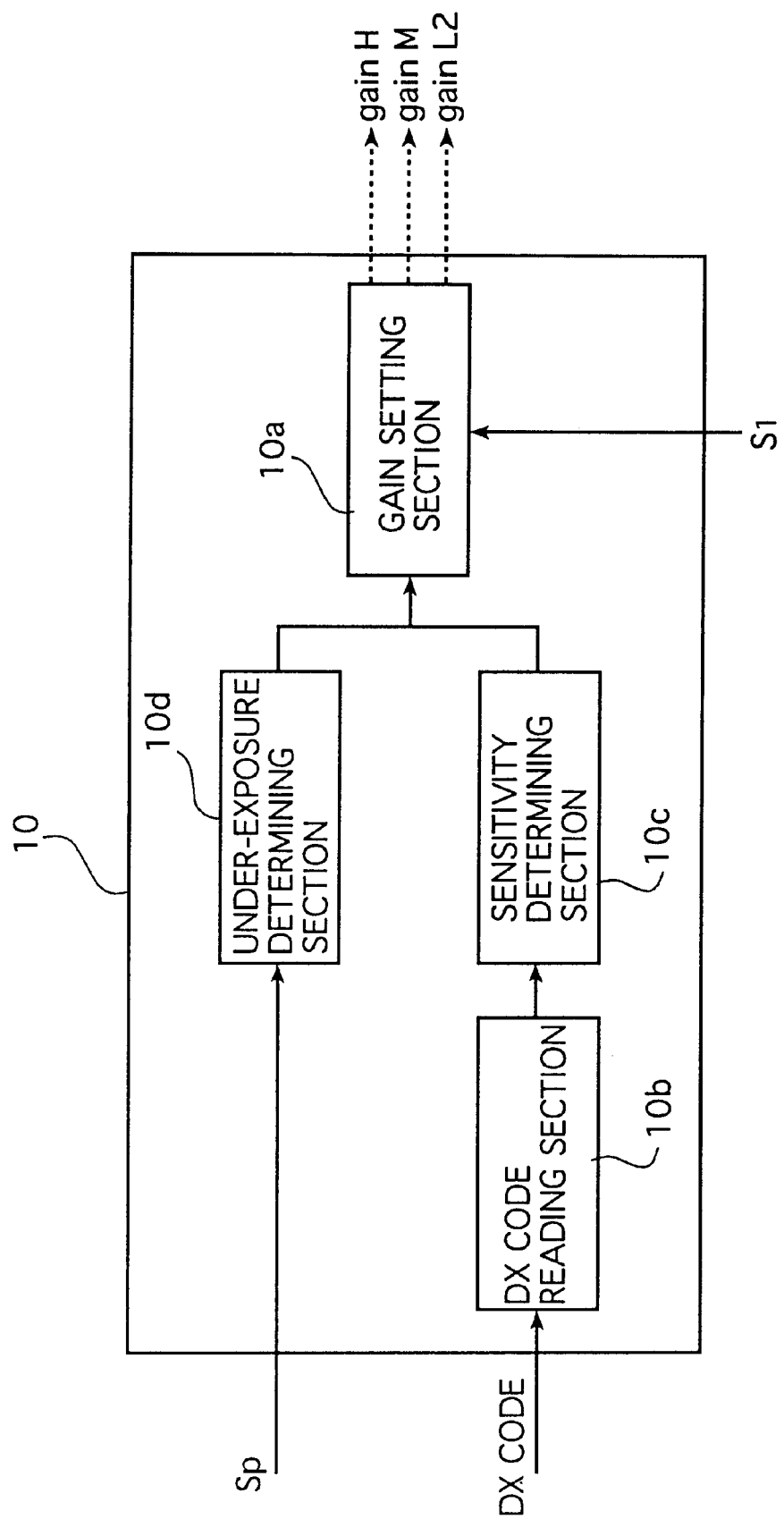
FIG. 2 is a block diagram showing an arrangement of an automatic set-up operation unit shown in FIG. 1.

How the parameters are set will be described hereinbelow in detail. In the automatic set-up operation unit 10, the density range of the color image 4 is determined from the received pre-scanning image signals $S_P$. Further, the operator indicates the print size of the color image 4 to be output. As shown in FIG. 2, in the gain setting section 10a of the automatic set-up operation unit 10, a gain M, by which the middle frequency components are to be multiplied in the enhancement and suppression processing carried out by the processing section 13 which will be described later, and a gain H, by which the high frequency components are to be multiplied in the enhancement and suppression processing, are determined in accordance with the signal $S_1$, which has been received from the CRT display device 11 via the interface 12.

In the embodiment, a DX code reading section 10b, a film sensitivity determining section 10c and an under-exposure determining section 10d are further provided. As described later in detail, when it is determined that a film original is an under-exposed negative film or a high sensitive negative film, the above gains are changed as well as a gain L2 to be multiplied by second low frequency components is determined. In addition, in the automatic set-up operation unit 10, the parameters for the color and gradation processing, which is carried out by the color and gradation processing unit 14, are determined and fed to the processing unit 13 and a color and gradation processing unit 14.

Thereafter, with the reading section 1, the fine scanning operation is carried out by scanning the color image 4 at fine scanning intervals, and the three-color fine scanning data $S_F$ are thereby obtained as the color image signals. The fine scanning data $S_F$ are converted by the analog-to-digital converter 7 into digital image signals. The digital fine scanning data $S_F$ are corrected by the CCD compensation unit 8, logarithmically amplified by the logarithmic conversion unit 9, and fed into the color and gradation processing unit 14. In the color and gradation processing unit 14, the color and gradation processing is carried out on the fine scanning data S. The fine scanning data $S_F$ having been obtained from the color and gradation processing are fed into the processing unit 13. How the processing is carried out by the processing unit 13 will be described below.

Figure 3:
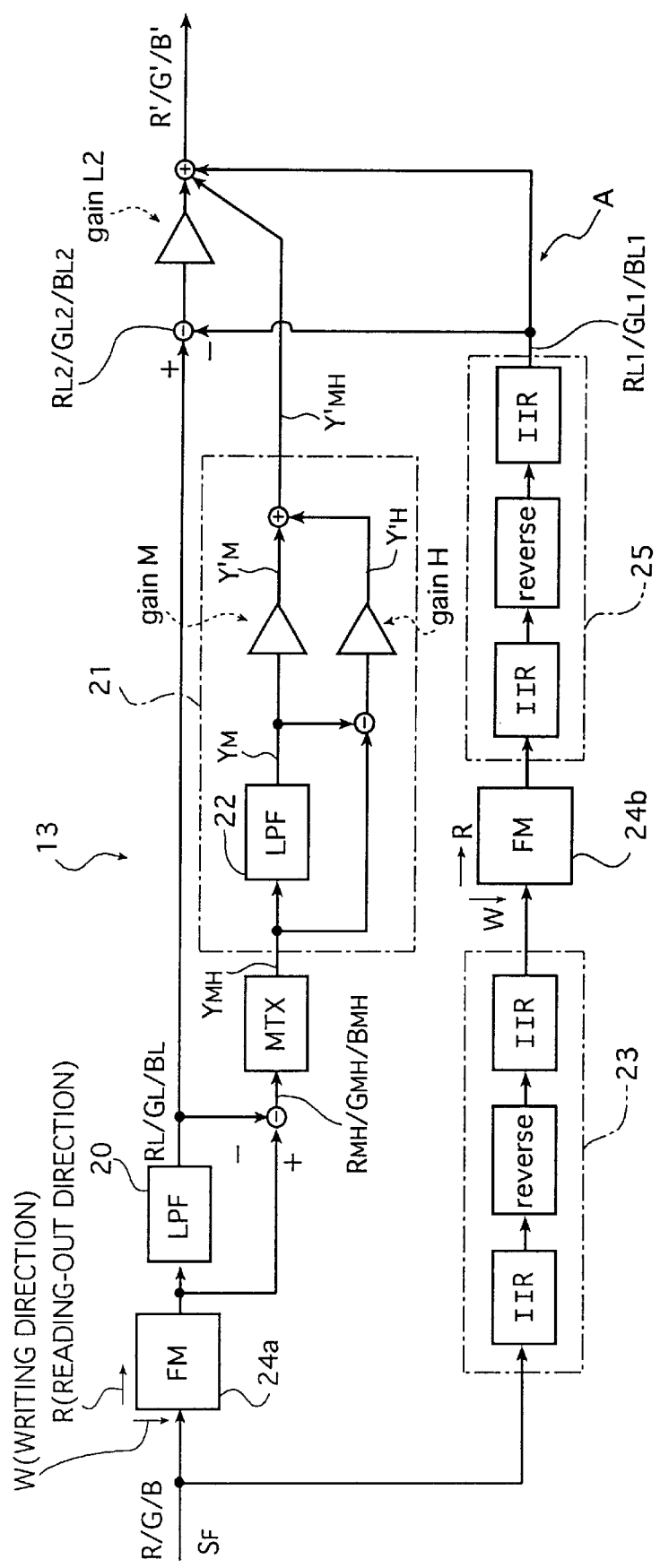
FIG. 3 is a block diagram schematically showing an arrangement of a processing unit shown in FIG. 1.

FIG. 3 is a block diagram for explaining how the processing is carried out in the processing unit 13 in detail. As shown in FIG. 3, the fine scanning data $S_F$ (R, G and B) in a frame memory 24a is filtered by a low-pass filter 20 and the low frequency components $R_L$, $G_L$ and $B_L$ of the fine scanning data $S_F$ (R, G and B) are extracted.

Then, middle and high frequency components $R_{MH}$, $G_{MH}$ and $B_{MH}$ are extracted by subtracting the low frequency components $R_L$, $G_L$ and $B_L$ from the fine scanning data $S_F$. The low frequency components $R_L$, $G_L$ and $B_L$, which have been extracted, do not so much contain the information concerning the edge and fine texture portions of the color image. Further, when the film original is not the under-exposed negative film or the high sensitive film, it does not contain unevenness due to the graininess of the film. Whereas, the middle frequency components $R_M$, $G_M$ and $B_M$ contain the unevenness due to the film graininess. The high frequency components $R_H$, $G_H$ and $B_H$ contain the information concerning the edge and fine texture portions of the color image.

Figure 4:
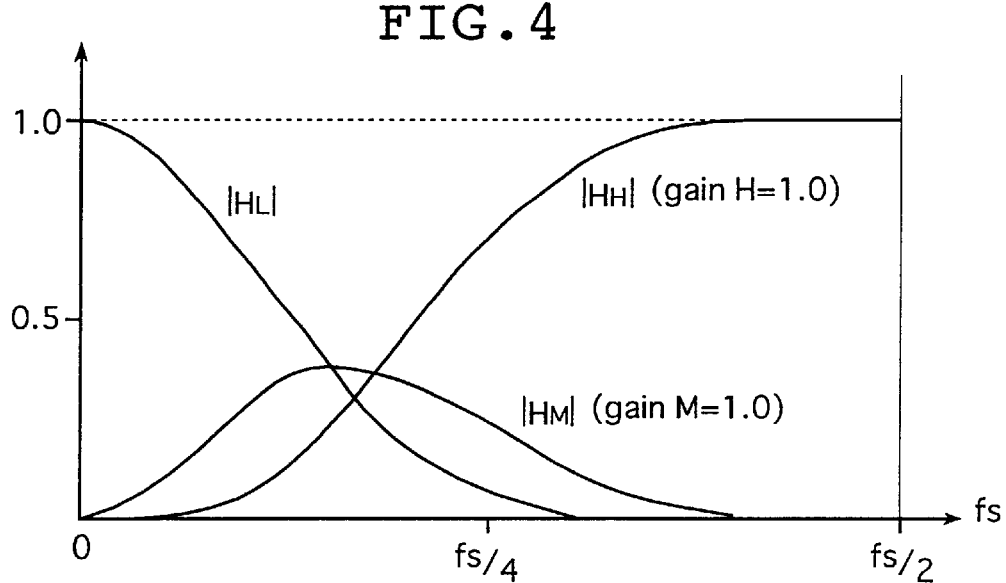
FIG. 4 is a graph showing an example of distributions of low, middle and high frequency components.

The term "low frequency components, middle frequency components, and high frequency components of fine scanning data $S_F$" as used herein means the frequency components that are distributed in the patterns shown in FIG. 4 in cases where the gain M, by which the middle frequency components are to be multiplied, and the gain H, by which the high frequency components are to be multiplied, are equal to 1.0. The middle frequency components M ($R_M$, $G_M$ and $B_M$) are distributed in a pattern $H_M$ such that they may have a peak in the vicinity of ⅓ of the Nyquist frequency $f_s/2$ of the output in the reproduction of a visible image from the signals having been processed. The low frequency components L ($R_L$, $G_L$ and $B_L$) are distributed in a pattern $H_L$ such that they may have a peak at a frequency of zero. The high frequency components H ($R_H$, $G_H$ and $B_H$) are distributed in a pattern $H_H$ such that they may have a peak at the Nyquist frequency $f_s/2$ of the output. The term "Nyquist frequency" as used in this embodiment means the Nyquist frequency which is determined when the recording on the recording material 16 is carried out at 300 dpi. In FIG. 4, at each frequency, the sum of the low, middle, and high frequency components becomes equal to 1. However, the peak position of the middle frequency components is not limited to the above position, and it is preferable to set the peak position depending upon circumstances so that the unevenness of a film is suppressed and a reproduced image is not broken.

Thereafter, the luminance components are extracted from the middle and high frequency components $R_{MH}$, $G_{MH}$, and $B_{MH}$, which have been separated from the fine scanning data $S_F$. The luminance components can be extracted by converting the middle and high frequency components $R_{MH}$, $G_{MH}$, and $B_{MH}$ of the fine scanning data $S_F$ to the YIQ base and thereby obtaining luminance components $Y_{MH}$. The conversion to the YIQ base is carried out with the formula shown below.

$$\begin{bmatrix} I \\ Q \\ Y \end{bmatrix} = \begin{bmatrix} 0.60 & -0.28 & -0.32 \\ 0.21 & -0.52 & 0.31 \\ 0.30 & 0.59 & 0.11 \end{bmatrix} \begin{bmatrix} R \\ G \\ B \end{bmatrix}$$

Components $I_{MH}$ and $Q_{MH}$, which are the chrominance components obtained from the conversion to the YIQ base, contain the unevenness of color due to the film graininess.

Therefore, in this embodiment, the components $I_{MH}$ and $Q_{MH}$ are set to be zero such that the unevenness of color due to the film graininess can be suppressed. It has been known experimentally that the components $I_{MH}$ and $Q_{MH}$, which are the chrominance components, have little level of component in the cases of images of ordinary objects. Therefore, the components $I_{MH}$ and $Q_{MH}$ can be regarded as being the components constituting the unevenness of color due to the film graininess and are set to be zero. In this manner, the unevenness of color due to the film graininess can be suppressed, and a reproduced image having good image quality can be obtained. The Y signal need not be created by the manner mentioned above, and it may be, for example, ⅓ of the sum of $R_{MH}$, $G_{MH}$ and $B_{MH}$.

Next, in a gain processing unit 21, filter processing is carried out by a 5×5 low-pass filter 22, which will be shown below, on the luminance component $Y_{MH}$. Middle frequency components $Y_M$ of the luminance component $Y_{MH}$ are obtained thereby.

$$\begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix}$$

Further, the middle frequency components $Y_M$ are subtracted from the luminance components $Y_{MH}$, and the high frequency components $Y_H$ of the luminance components $Y_H$ are thereby obtained.

As shown in Formula (1), the middle frequency components $Y_M$ and the high frequency components $Y_H$ are then multiplied respectively by the gain M and the gain H, which have been set by the automatic set-up operation unit 10. Processed components $Y_M'$ and $Y_H'$ are thereby obtained. Further, the processed components $Y_M'$ and $Y_H'$ are combined with each other, and combined components $Y_{MH}'$ are thereby obtained.

$$Y_{MH}' = \text{gain } M \times \text{gain } Y_M + \text{gain } H \times Y_H \quad (1)$$

$(Y_M' = \text{gain } M \times Y_M, Y_H' = \text{gain } H \times Y_H)$

Figure 5A:
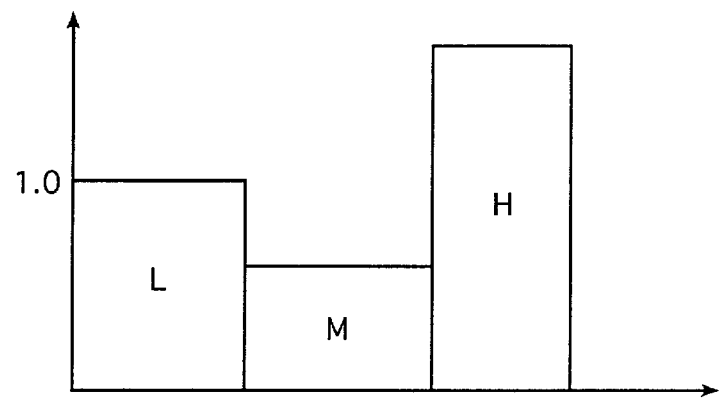
FIG. 5A and FIG. 5B are graphs showing how gains for graininess suppression are set in the embodiment and FIG. 5C is a graph showing another example for setting gains.

In the gain setting section 10*a* of the automatic set-up operation unit 10, the gain M and the gain H are ordinarily set such that gain M<1.0 and the gain H>1.0 as shown in FIG. 5A. That is, the unevenness of the luminance components due to film graininess is contained in the middle frequency components in a relatively large amount. Thus, the feeling of unevenness can be suppressed by setting the gain of the components $Y_M$ to a relatively low value. In addition, since the sharpness of image depends on the high frequency components of the luminance components, the sharpness of a processed image can be enhanced by setting the gain H of the high frequency components $Y_H$ of the luminance components to a relatively large value.

In contrast, first low frequency components L1, which are in the lowest frequency band, are extracted from the fine scanning data $S_F$ (R, G and B) by an IIR filter (infinite impulse response filter) 23. The first low frequency components L1 are subtracted from the low frequency components L to thereby create second frequency components L2. The fine scanning data $S_F$ is subjected to the filter processing twice by the IIR filter 23. More specifically, first, the filter processing is carried out from the right to the left of an image and second it is carried out from the left to the right thereof.

With this operation, the occurrence of the phase distortion of processed signals, which is caused because only the IIR filter is used, can be prevented. In addition, since only the IIR filter is used, a weight series in case of filtering can be shortened, whereby the size of an apparatus can be reduced. The image data, which has been filtered by the IIR filter 23, is written to a working frame memory 24*a* once. Then, the data, which has been turned 90° and read out, is subjected to filter processing twice by an IIR filter 25 again to thereby extract first low frequency components $R_{L1}$, $G_{L1}$ and $B_{L1}$. The two frame memories shown in FIG. 3, that is, the frame memory 24*a* and a frame memory 24*b* are necessary for two purposes. One of the purposes is to time an output and the other of them is to turn the image data 90° to apply the IIR filter 23 in both a vertical direction and a lateral direction.

Next, the second low frequency components $R_{L2}$, $G_{L2}$ and $B_{L2}$ are created by subtracting the first low frequency components $R_{L1}$, $G_{L1}$ and $B_{L1}$ from the low frequency components $R_L$, $G_L$ and $B_L$, which have been extracted by the low-pass filter 20. With this operation, in the embodiment, the components other than the high frequency components H are separated into the three frequency components, that is, the first low frequency components L1, the second low frequency components L2 and the middle frequency components M.

How the first low frequency components L1 are separated from the second low frequency components L2 is not particularly limited. However, it is ordinarily sufficient to separate them from each other at the position of approximate ½ of the low frequency components L.

The under-exposure determining section 10*d* of the automatic set-up operation unit 10 determines that the film original is the under-exposed negative film based on the pre-scanning data $S_P$. Otherwise, the film sensitivity determining section 10*c* of the automatic set-up operation unit 10 determines that the film original is the high sensitive negative film based on the DX code, which has been read from the film original by the DX code reading section 10*b*. When at least any one of the determinations is made, the gain setting section 10*a* sets the gains to be multiplied by the respective frequency components as shown in FIG. 5B.

Figure 5B:
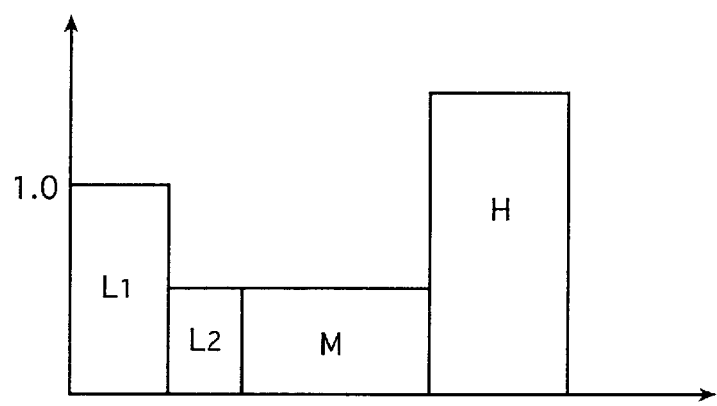

As shown in FIG. 5B, in the embodiment, the gain H to be multiplied by the high frequency components H is set greater than 1.0, and both of the gain M to be multiplied by the middle frequency components M and the gain L2 to be multiplied by the second low frequency components L2 are set less than 1.0. That is, the band of the middle frequency components M is extended to a region lower than an ordinary region. The under-exposed negative film or the high sensitive negative film contains the graininess of the low frequency components in a larger amount. Accordingly, the suppression of the frequency components in the band suppresses the graininess, and a reproduced image having better image quality can be obtained thereby.

Figure 6:
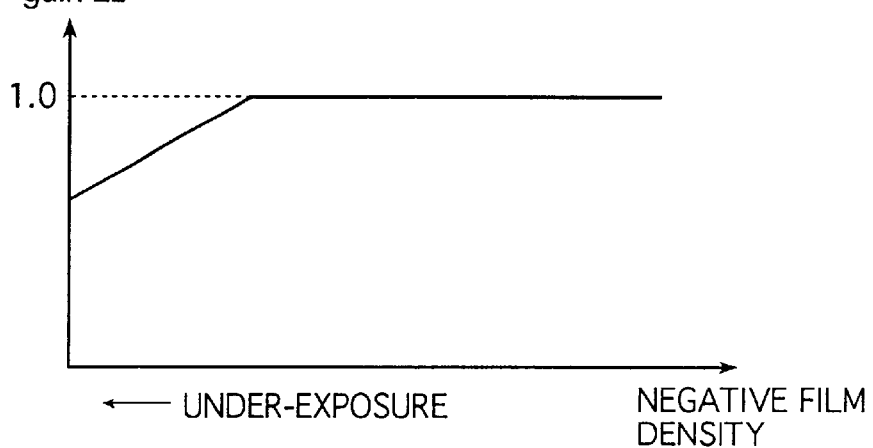
FIG. 6 is a graph showing how a gain is set to a second low frequency component.
Figure 5C:
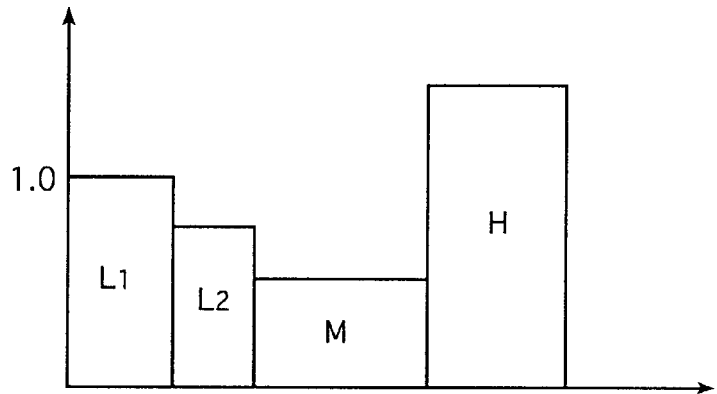

Further, as shown in FIG. 5C, the gain M and the gain L2, which are multiplied by the middle frequency components M and the second low frequency components L2, respectively, may be individually set. At the time, the gain L2 may be fixed. Otherwise, for example, the gain L2 may be ordinarily set to 1.0 and made smaller than 1.0 as the density of a negative film is made to an under-exposed state as shown in FIG. 6. In addition, it is yet better to detect the edge of an image and to subject only the image region of the image other than the edge portion thereof to the suppression processing. For example, the correlation value among the red, green and blue of the middle and high frequency components is calculated. When the correlation value is large, it is determined that an edge region is detected, and the suppression processing is applied to the image region other than the edge region.

The second low frequency components $R_{L2}$, $G_{L2}$ and $B_{L2}$ are multiplied by the gain L2. Processed signals R', G' and B' can be obtained by adding the above synthesized component $Y_{MH}'$ and the lowest frequency components $R_{L1}$, $G_{L1}$ and $B_{L1}$ to the thus multiplied second low frequency components $R_{L2}$, $G_{L2}$ and $B_{L2}$.

Thereafter, the processed signals R', G' and B' are supplied to the reproducing section 3 and reproduced on the recording material 16 by the printer 15 as a visible image.

Since an increase in a print size makes the coarseness of grains more perceptible, the graininess in the low frequency band is suppressed by changing the band of the second low frequency components L2 in accordance with the print size indicated by the operator. That is, when the print size is large, the band of the second low frequency components L2 is extended to a lower region. Then, the gain to be multiplied by second low frequency components L2 is set less than 1.0 so that the frequency components can be suppressed, similarly to the abovementioned. With this processing, feeling of unevenness, which becomes perceptible when a print is enlarged, can be suppressed.

Figure 7:
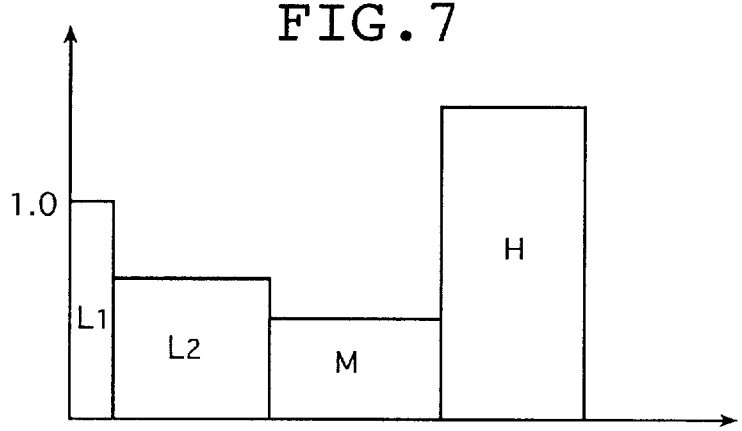
FIG. 7 is a graph showing how respective frequency components are suppressed in soft focus processing.
Figure 8:
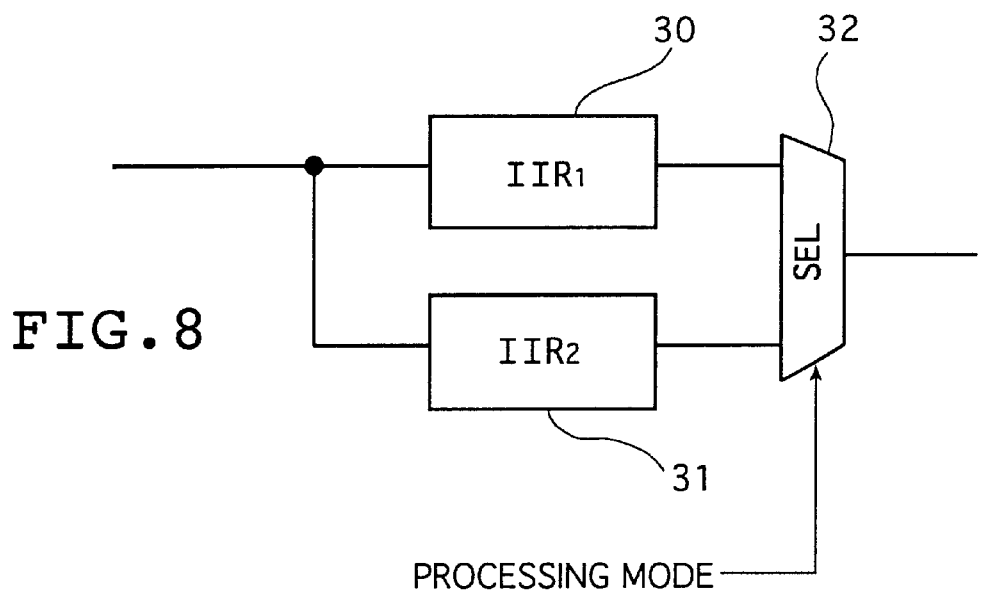
FIG. 8 is a block diagram showing an embodiment of a circuit arrangement for selectively carrying out graininess suppression processing to an under-exposed negative film and the like and soft focus processing.

As shown in FIG. 7, when the band of the first low frequency components L1 is narrowed toward a yet lower region, soft focus processing is carried out. In order to carry out the soft focus processing together with the graininess suppression processing to the under-exposed negative film, or the like, it is sufficient to prepare two IIR filters having a different characteristic and to switch them. As shown in FIG. 8, an IIR filter 30, which is used to the under-exposed negative film and the like, and an IIR filter 31, which is used in the soft focus processing, are disposed in parallel with each other, and they are switched by a selector 32. The switching of them is carried out by a mode which is previously set.

Figure 11:
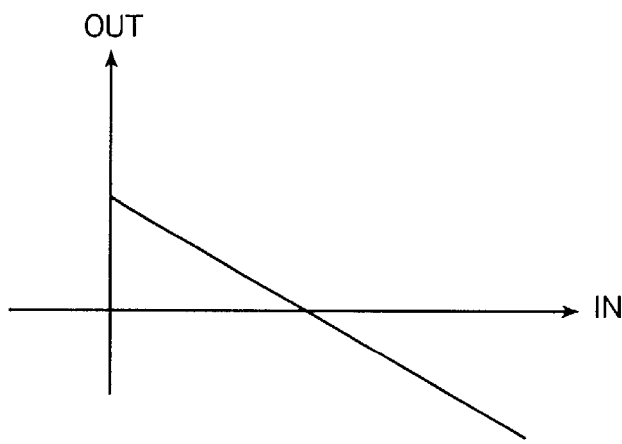
FIG. 11 is a graph showing a look-up table shown in FIG. 10.
Figure 9:
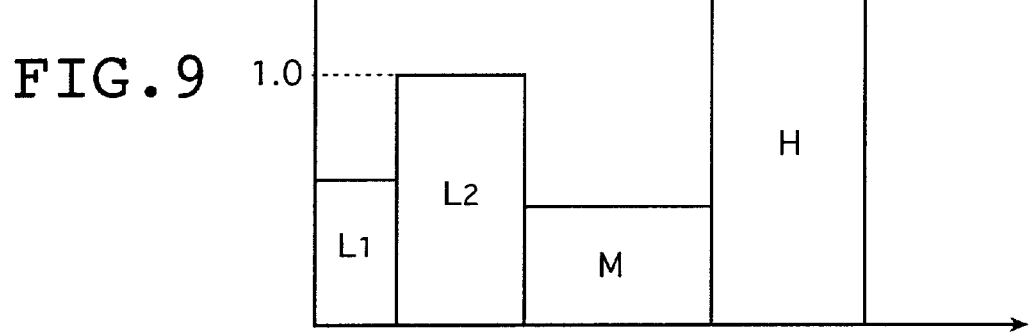
FIG. 9 is a block diagram showing how the respective frequency components are suppressed in the case of dodging processing.
Figure 10:
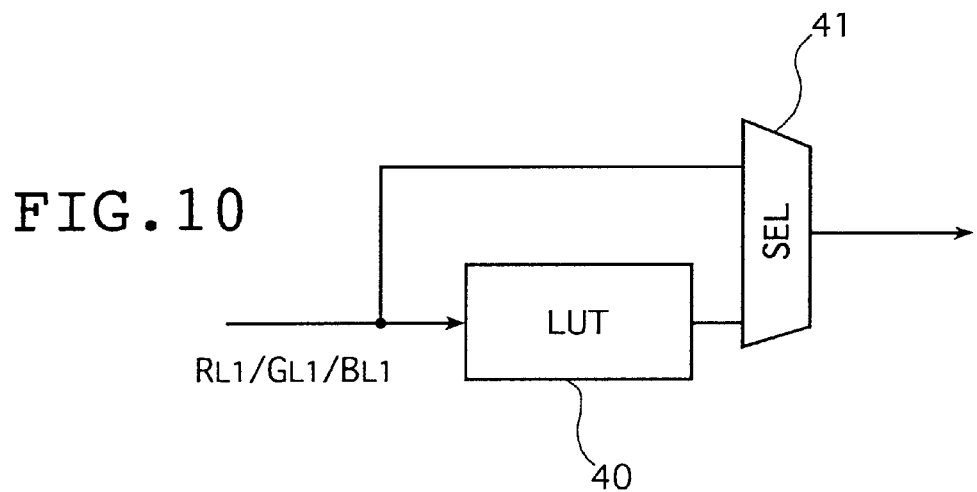
FIG. 10 is a block diagram showing an embodiment of a circuit arrangement for selectively carrying out the graininess suppression process to the under-exposed negative film and the like and the dodging processing.

In dodging processing, the gain L1 to be multiplied by the lowest first low frequency components L1 is set less than 1.0 as shown in FIG. 9 to suppress the first low frequency components L1. In order to suppress the frequency characteristics of the first low frequency components L1, a circuit is added to permit the low frequency components L1 ($R_{L1}$, $G_{L1}$, $B_{L1}$) to selectively pass through a look-up table (LUT) 40 as shown in FIG. 10. The circuit is provided at, for example, the portion (the portion shown by a symbol A in FIG. 3) upstream of the portion where the low frequency components L1 ($R_{L1}$, $G_{L1}$, $B_{L1}$) are added to the frequency components $R_{L2}$, $G_{L2}$ and $B_{L2}$ which have been multiplied by the gain L2. A look-up table having a negative inclination as shown in FIG. 11 can be used as the look-up table 40. It is possible to switch the LUT 40 by a selector 41. With this arrangement, when the low frequency components L1 pass through the LUT 40, the dodging processing is carried out. Whereas, when they do not pass through the LUT 40, the graininess suppression processing, which is ordinarily carried out to the under-exposed negative film and the like, is carried out.

The IIR filter is used to create the second low frequency components L2 in the embodiment because the use of a finite impulse response (FIR) filter would need many taps, whereby the scale of hardware is increased and the cost thereof is increased. The use of the IIR filter can reduce a circuit scale and the cost thereof. In particular, the use of the IIR filter is preferable when it is used to the soft focus processing as well as to the dodging processing. In contrast, when only the graininess of the under-exposed negative film is suppressed, the use of the FIR filter does not so much increase the cost.

While the image processing method and apparatus of the present invention has been described above in detail, the present invention is by no means limited to the above embodiment and it goes without saying that various improvements and modifications can be made within the range which does not depart from the gist of the invention.

As described above, according to the present invention, graininess can be suppressed even in the under-exposed negative film and the high sensitive negative film, and a reproduced image having a high image quality can be obtained.

When the frequency components in the low band are created by using the IIR filter, the circuit scale and cost thereof can be reduced.

When the frequency components in the low band are changed in accordance with the size of a print, graininess can be suppressed even if the print is enlarged to a large size.

Further, when it is permitted to switch between the soft focus processing and the dodging processing by the mode which is previously set, the graininess suppression processing, which is carried out to the under-exposed negative film and the like, and the soft focus processing or the dodging processing can be suitably selected.

What is claimed is:

1. An image processing method for carrying out graininess suppression to input image signals which have been obtained by photoelectrically reading a film original by an image reading device, comprising the steps of:

separating the input image signals into at least three kinds of frequency components composed of lowest frequency components a band of which is made more narrower, when it is determined that the film original is at least one of an under-exposed negative film and a high sensitive film, as compared with a case that the film original is neither the under-exposed negative film nor the high sensitive film, frequency components containing high frequency components and at least one kind of remaining frequency components;

enhancing said frequency components containing the high frequency components; as well as suppressing at least one kind of frequency components of said at least one kind of the remaining frequency components; and synthesizing said enhanced frequency components, said suppressed frequency components and said lowest frequency components.

2. The image processing method according to claim 1, wherein said lowest frequency components are regarded as first low frequency components;

said at least one kind of the remaining frequency components is separated into second low frequency components and middle frequency components in order of frequency; and said input image signals are separated into the first low frequency components, the second low frequency components, the middle frequency components and the high frequency components in order of frequency.

3. A method for performing image processing to carry out graininess suppression on input image signals which have been obtained by photoelectrically reading a film original by an image reading device, comprising the steps of:

when it is determined that said film original is at least one of an under-exposed negative film and a high sensitive film, classifying said input image signals into four kinds of frequency components composed of first low frequency components having a lowest frequency band, second low frequency components, middle frequency components and high frequency components, as well as separating said input image signals into at least three kinds of frequency components composed of said first low frequency components, frequency components containing at least said second low frequency components and frequency components containing at least said high frequency components;

performing enhancement processing on said frequency components containing at least said high frequency components;

performing suppression processing on said frequency components containing at least second low frequency components; and synthesizing both kinds of the processed frequency components and said first low frequency components.

4. The method according to claim 3, wherein said first low frequency components are created using an IIR filter.

5. The method according to claim 3, wherein said lowest band of the first low frequency components is changed in accordance with a print size of a print which is printed out after the image processing is carried out.

6. The method according to claim 3, wherein said frequency components are distributed in a pattern such that they may have a peek at a Nyquist frequency of output in reproduction of a visible image from image signals having been processed, said middle frequency components are distributed in a pattern such that they may have a peek in a vicinity of ⅓ to the Nyquist frequency of the output, said first low frequency components are lower halves of low frequency components that are distributed in a pattern such that they may have a peek at a frequency of zero, and said second low frequency components are upper halves of said low frequency components.

7. The method according to claim 3, wherein said high frequency components contain information concerning edge and fine texture portions of a color image of said film original, said middle frequency components contain unevenness due to graininess of the film original, said first low frequency components contain neither the information concerning the edge and fine texture portions of the color image of said film original nor the unevenness due to the graininess of the film original, and said second frequency components contain no information concerning the edge and fine texture portions of the color image of said film original and the unevenness due to the graininess of the film original in case that said film original is at lest one of the under-exposed negative film and the high sensitive film.

8. The method according to claim 3, wherein luminance components are extracted from said high and middle frequency components and said enhancement processing and suppression processing are performed based on said luminance components.

9. The method according to claim 3, wherein said image processing for carrying out the graininess suppression can be switched to one of soft focus processing and dodging processing by modes which are previously set.

10. The method according to claim 3, wherein, when it is determined that said film original is neither the under-exposed negative film nor the high sensitive film, said input image signals are separated into three kinds of the frequency components composed of a low frequency components containing the first and second frequency components, said middle frequency components, said high frequency components, said enhancement processing is performed on said high frequency components, said suppression processing is performed on said middle frequency components and both processed frequency components and said low frequency components are synthesized.

11. An image processing apparatus for carrying out graininess suppression to input image signals which has been obtained by photoelectrically reading a film original by an image reading device, comprising:

determination means for determining that said film original is at least one of an under-exposed negative film and a high sensitive film;

separation means for separating the input image signals into at least three kinds of frequency components composed of lowest frequency components a band of which is made more narrower, when it is determined by said determination means that the film original is at least one of the under-exposed negative film and the high sensitive film, as compared with a case that the film original is neither the under-exposed negative film nor the high sensitive film, frequency components containing high frequency components and at least one kind of remaining frequency components;

enhancement means for enhancing said frequency components containing the high frequency component;

suppression means for suppressing at least one kind of frequency components of said at least one kind of the remaining frequency components; and synthesis means for synthesizing said enhanced frequency components, said suppressed frequency components and said lowest frequency components.

12. An image processing apparatus according to claim 11, wherein said separation means regards said lowest frequency components as first low frequency components, separates said at least one kind of the remaining frequency components into second low frequency components and middle frequency components in order of frequency and separates said input image signals into the first low frequency components, the second frequency components, the middle frequency components and the high frequency components in order of frequency.

13. An apparatus for performing image processing to carry out graininess suppression on input image signals which have been obtained by photoelectrically reading a film original by an image reading device, comprising:

determination means for determining that said film original is at least one of an under-exposed negative film and a high sensitive film;

classification means for classifying said input image signals into four kinds of frequency components composed of first low frequency components having a lowest frequency band, second low frequency components, middle frequency components and high frequency components;

separation means for separating said input image signals into at least three kinds of frequency components composed of said first low frequency components, frequency components containing at least said second low frequency components and frequency components containing at least said high frequency components, when determined that said film original is at least one of the under-exposed negative film and the high sensitive film;

enhancement processing means for performing enhancement processing on said frequency components containing at least said high frequency components;

suppression processing means for performing suppression processing on said frequency components containing at least second low frequency components; and synthesis means for synthesizing both kinds of the processed frequency components and said first low frequency components.

14. The apparatus according to claim 13, wherein said separation means creates said first low frequency components using an IIR filter.

15. The apparatus according to claim 13, further comprising changing means for changing said lowest band of the first lower frequency components in accordance with a print size of a print which is printed out after the image processing is carried out.

16. The apparatus according to claim 13, wherein said frequency components are distributed in a pattern such that they may have a peek at a Nyquist frequency of output in reproduction of a visible image from image signals having been processed, said middle frequency components are distributed in a pattern such that they may have a peek in a vicinity of ⅓ to the Nyquist frequency of the output, said first low frequency components are lower halves of low frequency components that are distributed in a pattern such that they may have a peek at a frequency of zero, and said second low frequency components are upper halves of said low frequency components.

17. The apparatus according to claim 13, wherein said high frequency components contain information concerning edge and fine texture portions of a color image of said film original, said middle frequency components contain unevenness due to graininess of the film original, said first low frequency components contain neither the information concerning the edge and fine texture portions of the color image of said film original nor the unevenness due to the graininess of the film original, and said second frequency components contain no information concerning the edge and fine texture portions of the color image of said film original and the unevenness due to the graininess of the film original in case that said film original is at least one of the under-exposed negative film and the high sensitive film.

18. The apparatus according to claim 13, further comprising extracting means for extracting luminance components from said high and middle frequency components, wherein said enhancement processing means and said suppression means perform said enhancement processing and suppression processing based on said luminance components extracted by the extracting means, respectively.

19. An image processing apparatus according to claim 13, further comprising switching means for switching modes from the image processing for carrying out the graininess suppression to one of soft focus processing and dodging processing which are previously set as the modes.

20. The apparatus according to claim 13, wherein, when it is determined by said determination means that said film original is neither the under-exposed negative film nor the high sensitive film, said separation means separates said input image signals into three kinds of the frequency components composed of a low frequency components containing the first and second frequency components, said middle frequency components, said high frequency components, said enhancement processing means performs said enhancement processing on said high frequency components, said suppression processing means performs said suppression processing on said middle frequency components and said synthesis means synthesizes both processed frequency components and said low frequency components.

* * * * *